United States Patent
Kwon et al.

(10) Patent No.: US 8,457,076 B2
(45) Date of Patent: Jun. 4, 2013

(54) APPARATUS AND METHOD FOR TRANSMITTING AND RECEIVING A RACH SIGNAL IN SC-FDMA SYSTEM

(75) Inventors: Sung Lark Kwon, Seoul (KR); Dong Joo Park, Seongnam-si (KR); Hyuck Chan Kwon, Seoul (KR); Young Kwon Ryu, Gwangmyeong-si (KR); Hoo Young Jeong, Seongnam-si (KR); Hong Jik Kim, Seoul (KR); Jung Seung Lee, Uiwang-si (KR); Jae Won Jang, Seoul (KR); Byoung Seong Park, Incheon (KR); Hee Gul Park, Yongin-si (KR)

(73) Assignee: LG-Ericsson Co., Ltd., Seoul (KR)

(*) Notice: Subject to any disclaimer, the term of this patent is extended or adjusted under 35 U.S.C. 154(b) by 1661 days.

(21) Appl. No.: 11/654,000

(22) Filed: Jan. 17, 2007

(65) Prior Publication Data

US 2007/0171889 A1  Jul. 26, 2007

(30) Foreign Application Priority Data

Jan. 20, 2006 (KR) .................. 10-2006-0006531
Jul. 12, 2006 (KR) .................. 10-2006-0065323

(51) Int. Cl.
  *H04B 7/216* (2006.01)
  *H04J 1/06* (2006.01)
  *H04J 11/00* (2006.01)
  *H04W 4/00* (2009.01)

(52) U.S. Cl.
  USPC ........ 370/335; 370/210; 370/328; 370/331; 370/343

(58) Field of Classification Search
  USPC ................. 370/210, 331, 328, 335, 343
  See application file for complete search history.

(56) References Cited

U.S. PATENT DOCUMENTS

2004/0082356 A1  4/2004  Walton et al.
2004/0170157 A1  9/2004  Kim et al.
(Continued)

FOREIGN PATENT DOCUMENTS

KR  10-2004-0077279  9/2004
KR  10-2005-0079847  8/2005
(Continued)

OTHER PUBLICATIONS

European Search Report dated Jun. 22, 2007.
(Continued)

*Primary Examiner* — Wesley Kim
(74) *Attorney, Agent, or Firm* — KED & Associates, LLP

(57) ABSTRACT

Embodiments of the present invention may provide an apparatus and a method for transmitting and receiving a random access channel (RACH) in a single carrier-frequency division multiple access (SC-FDMA) system. A frequency domain RACH signal may be mapped to a localized sub-frequency band of an entire frequency band available to the SC-FDMA system. A guard band including at least one sub carrier may be allocated between the RACH signal band and other channel signal bands. A guard time may be allocated between the RACH signal and other channel signals in the time domain. The RACH signal may include a short message including information related to a mobile station. The RACH signal may be detected in a frequency based method, a time based method or a sliding matched filter based method. Receiver complexity can be decreased if the RACH signal includes a CAZAC code sequence for a preamble. In such a case, a receive delay may be simply calculated and then adjusted more accurately.

8 Claims, 18 Drawing Sheets

U.S. PATENT DOCUMENTS

| | | | |
|---|---|---|---|
| 2005/0068922 A1 | 3/2005 | Julali | |
| 2005/0113099 A1 | 5/2005 | Eriksson et al. | |
| 2005/0226140 A1 | 10/2005 | Zhuang et al. | |
| 2005/0286409 A1 | 12/2005 | Yoon et al. | |
| 2005/0286465 A1 | 12/2005 | Zhuang | |
| 2007/0081604 A1* | 4/2007 | Khan et al. | 375/261 |
| 2007/0147310 A1* | 6/2007 | Cai | 370/335 |
| 2008/0318567 A1* | 12/2008 | Popovic et al. | 455/422.1 |

FOREIGN PATENT DOCUMENTS

| | | |
|---|---|---|
| KR | 10-2006-0000185 | 1/2006 |
| WO | WO 92/00639 | 1/1992 |
| WO | WO 99/04584 | 1/1999 |
| WO | WO 01/47146 | 6/2001 |
| WO | WO 2004/023674 | 3/2004 |
| WO | WO 2004/102852 | 11/2004 |

OTHER PUBLICATIONS

3$^{rd}$ Generation Partnership Project: "Physical Layer Aspects for Evolved UTRA" (Release 7), Dec. 6, 2005).

R. Dinis et al. "A multiple access scheme for the uplink of broadband wireless systems;" Global Telecommunications Conference 2004. GLOBECOM '04, IEEE Dallas, TX, Nov. 29-Dec. 3, 2004; pp. 3808-3812.

Jan-Jaap Van De Beek et al.; "A Time and Frequency Synchronization Scheme for Miltiuser OFDM;" IEEE Journal on Selected Areas in Communications, IEEE Service Center, Piscatawa, NJ, vol. 17, No. 11, Nov. 1999; pp. 1900-1913.

European Search Report dated Sep. 21, 2007.

3$^{rd}$ Generatoin Partnership Project; Technical Specification Group Ridio Access Network; Physical Layer Aspects for Evolved UTRA (Release 7) 3GPP TR 25.814 VA.0.1 (Nov. 2005); pp. 1-72, dated 2005.

Rui Dinis et al.; "A Multiple Access Scheme for the Uplink of Broadband Wireless Systems;" IEEE Communications Society Globecom 2004, pp. 3808-3812.

Jan-Jaap van de Beek et al.; "A Time and Frequency Synchronization Scheme for Miltiuser OFDM;" IEEE Journal on Selected Areas in Communications, Vo. 17. No. 11, Nov. 1999 pp. 1900-1913.

Xiangyang Zhuang et al. "Ranging Improvement for 802.16e OFDMA PHY;" IEEE 802.16 Broadband Wireless Access Working Group; Jun. 25, 2004.

Doo Hwan Lee; OFDMA Uplink Ranging from IEEE 802.16e Using Modified Generalized Chirp-Like Polyphase Sequences;: Internet, 2005, The First IEEE and IFIP International Conference in Central Asia, Sep. 26, 2005.

Xiaoyu FU et al.; "Initial Uplink Synchronization and Pover Control (Ranging Process) for OFDMA Systems;" IEEE Communications Society, Globecom 2004, pp. 3999-4003.

Korean Office Action dated Jan. 20, 2012 for Application 10-2006-0065323.

3$^{rd}$ Generation Partnership Technical Specification Group Radio Access Physical Layer Aspects for Evolved UTRA (Release 7), 3GPP TR 25.814 V1.0.1. (Nov. 2005).

* cited by examiner

FIG. 16

$$T_m = \sum_{n=0}^{U} Y_n e^{j2\pi mn/U}$$

$Y_n \rightarrow$ (U-1) → [block] → $T_m$ (U)

$m = m_1, m_2, \cdots m_M$

APPARATUS AND METHOD FOR TRANSMITTING AND RECEIVING A RACH SIGNAL IN SC-FDMA SYSTEM The present application claims priority from Korean Patent Application Nos. 10-2006-6531, filed Jan. 20, 2006 and 10-2006-65323, filed Jul. 12, 2006, the subject matters of which are incorporated herein by reference.

BACKGROUND

1. Field

Embodiments of the present invention may relate to a mobile communication apparatus and method. More particularly, embodiments of the present invention may relate to an apparatus and method for transmitting and receiving a random access channel (RACH) signal in a single carrier-frequency division multiple access (SC-FDMA) system.

2. Background

A common channel may be used to request for uplink synchronization and data traffic channels. Such a common channel may be defined as a RACH. A RACH signal may include a preamble portion and a message portion. The base station may use 1 bit preamble information received from the mobile station to determine the presence of a RACH message and to calculate timing offsets (receive delay). In response to receiving the preamble from the mobile station, the base station transmits an ACK (ACKnolwedge) to the mobile station. In response to receiving an ACK from the base station, the mobile station transmits the RACH message to the base station. The RACH message may include a message in an upper layer for the mobile station to connect to the network. The message may include, for example, the mobile station's identification, the purpose of connection to the network, priorities, etc. If the mobile station transmits the RACH message to the base station after a predetermined time or after the mobile station receives an ACK from the base station, then the base station may not obtain information related to the mobile station until it receives the RACH message. Therefore, the base station has to predict performance of the mobile station if it has to transmit any messages to the mobile station before receiving the RACH message.

The RACH signal may be transmitted and received in a code division multiple access (CDMA) method for a wide-band CDMA (WCDMA) system and in an orthogonal frequency division multiple access (OFDMA) method for worldwide interoperability for microwave access (WiMax) system. These two methods are briefly discussed below.

FIG. 1 illustrates a RACH signal transmission for a CDMA system according to one arrangement. A code is allocated to a RACH since channels are divided by their unique codes in the CDMA system. A preamble of the RACH signal may include the allocated code. As the number of codes for the preamble increases, the likelihood for mobile stations to conflict decreases. As shown in FIG. 1, a mobile station transmits a first preamble 120 to a base station. If the mobile station does not receive an ACK for the first preamble 120 from the base station, then the mobile station increases the transmitting power by Δ in order to transmit a second preamble 140. If the mobile station does not receive an ACK for the second preamble 140 from the base station, then the mobile station increases the transmitting power by Δ once again in order to transmit a third preamble 160. Such a power control is referred to as "preamble power ramping." This is because each user's signal may create interference noise to other users in the CDMA system, thereby requiring communication in minimum power. The base station performs sliding matched filtering of the received signal to determine the presence of the preamble. The base station determines that the preamble is present and transmits an ACK to the mobile station if a maximum value of the sliding matched filtered sequence exceeds a certain threshold. In response to receiving an ACK of the preamble from the base station, the mobile station transmits the RACH message 180 to the base station.

FIG. 2 illustrates a RACH signal transmitter and receiver for an OFDMA system according to an example arrangement. Other arrangements may also be used. A transmitter may include a data coder 210 and an Inverse Fast Fourier Transform (IFFT) unit 220, whereas a receiver may include a Fast Fourier Transform (FFT) unit 240 and a data decoder 250. As shown in FIG. 2, in order to detect the RACH preamble, the FFT unit 240 converts a received time domain signal into a frequency domain sequence. Accordingly, a reference timing (with which the FFT is performed) may be needed. If the receiver performs a sliding FFT as a CDMA receiver (since the RACH signal is not synchronized with the receiver), then a calculation complexity may become overwhelming. To simplify the receiver configuration, the preamble of the RACH signal may include two symbols in the OFDMA system as shown in FIG. 3.

FIG. 3 illustrates a RACH signal transmission for an OFDMA system according to an example arrangement. A section defined by a predetermined time duration and a predetermined frequency band is allocated to a RACH since channels are divided by time/frequency sections in the OFDMA system. As shown in FIG. 3, a RACH signal includes two symbols. Thus, at least one section includes one full symbol, which includes the parts of two symbols. Accordingly, the receiver can perform FFT of the received signal for a section so as to detect the RACH signal without performing exhausted sliding FFT.

A SC-FDMA system may have a structure similar to the OFDMA system. The SC-FDMA system may be different in performing frequency domain conversion before an IFFT 320 for transmitting a signal substantially in a single carrier. The uplink channels may need to be synchronized within a limit in order to prevent interference noises between signals of adjacent frequency bands in both the OFDMA system and the SC-FDMA system. However, one symbol duration in the SC-FDMA system may be relatively short. Thus, interference problems for RACH signal detection may become more serious.

BRIEF DESCRIPTION OF THE DRAWINGS

Arrangements and embodiments may be described in detail with reference to the following drawings in which like reference numerals refer to like elements and wherein:

FIG. 16 illustrates a second time domain converter for detection of a RACH signal including a CAZAC code sequence for a preamble according to an example embodiment of the present invention;

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
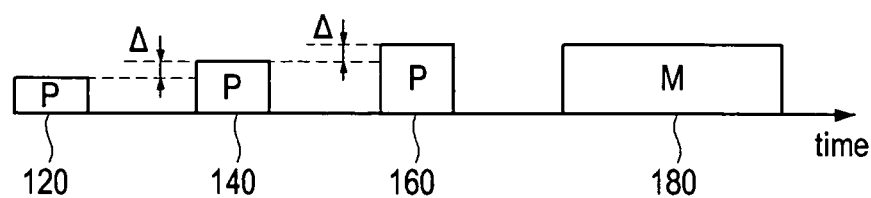
FIG. 1 illustrates a RACH signal transmission for a CDMA system according to an example arrangement.
Figure 2:
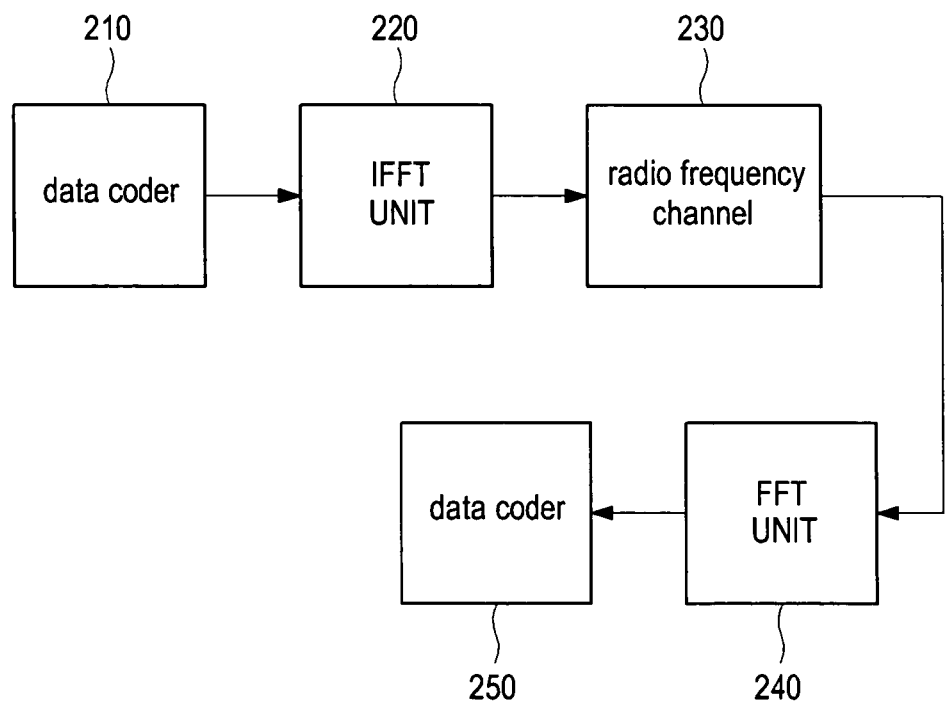
FIG. 2 illustrates a RACH signal transmitter and receiver for an OFDMA system according to an example arrangement.
Figure 3:
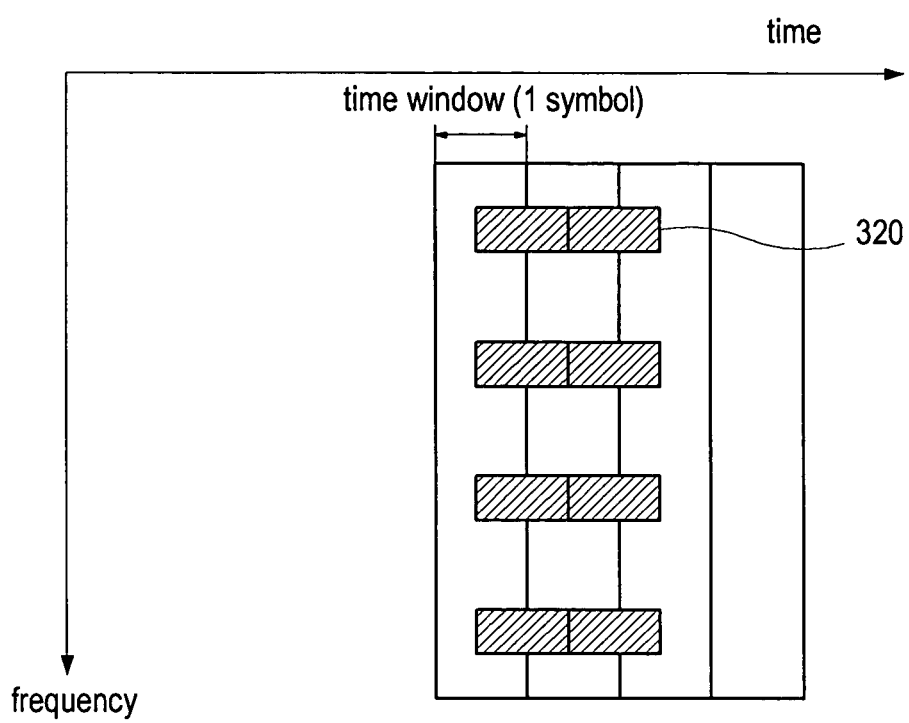
FIG. 3 illustrates a RACH signal transmission for an OFDMA system according to an example arrangement.
Figure 4:
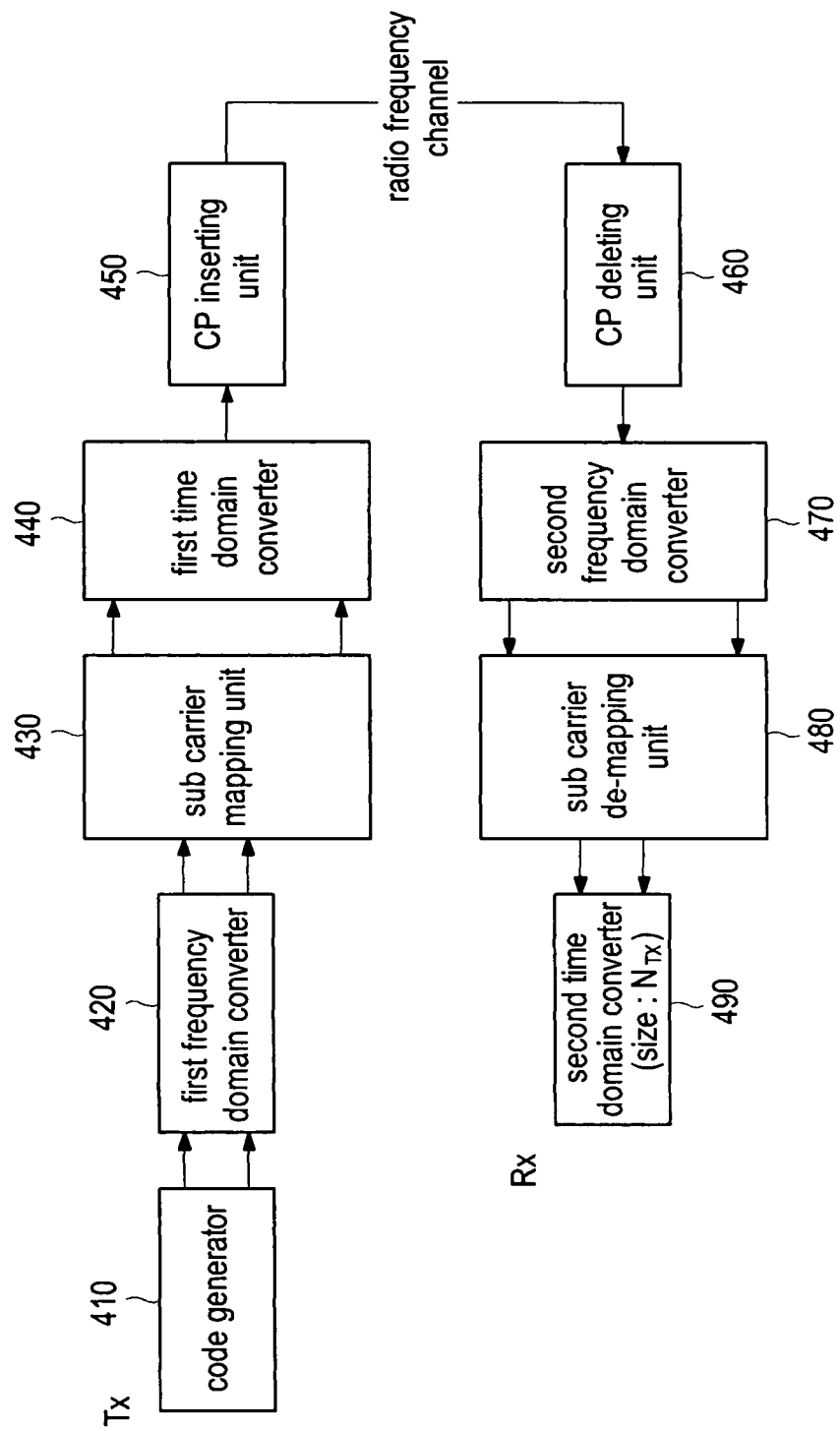
FIG. 4 illustrates a SC-FDMA system that may use RACH signal transmitting/receiving according to an example arrangement.

FIG. 4 illustrates a SC-FDMA system that may use RACH signal transmitting/receiving according to an example arrangement. Other arrangements may also be used. As shown in FIG. 4, a SC-FDMA system may include a transmitter (labeled TX) and a receiver (labeled LX). The transmitter TX may include a code generator 410, a first frequency domain converter 420, a sub carrier mapping unit 430, a first time domain converter 440 and a cyclic prefix (CP) inserting unit 450. The receiver LX may include a CP deleting unit 460, a second frequency domain converter 470, a sub carrier de-mapping unit 480 and a second time domain converter 490.

The code generator 410 may generate a code sequence for a preamble of the RACH signal. The code sequence for the preamble may require good correlation characteristics since the preamble is used for synchronization between the transmitter and the receiver. If a code sequence has a low cross correlation value and a high autocorrelation value only when it is synchronized, then the code sequence may have good correlation characteristics. Further, the code sequence for the preamble may require a low peak to average power ratio (PARP) to prevent an output signal at the power amplifier from being distorted. In at least one example embodiment, the code generator 410 may generate a CAZAC sequence. For example, the code generator may generate a Zadoff-Chu CAZAC sequence, which has good PARP characteristics for both time domain and frequency domain.

The first frequency domain converter 420 may convert the code sequence generated in the code generator 410 into a frequency domain sequence. In at least one example embodiment, the first frequency domain converter 420 may perform M-point Discrete Fourier Transform (DFT) of the code sequence to generate a frequency domain sequence. M may correspond to a number of discrete points used for DFT (e.g., may be the same as the chip number of the code sequence).

The sub carrier mapping unit 430 may map the frequency domain sequence generated in the first frequency domain converter 420 to a portion of sub carriers available to the system in a predetermined mode. For example, the sub carrier mapping unit 430 may map the frequency domain sequence to sub carriers in a distributed mode or in a localized mode.

Figure 5:
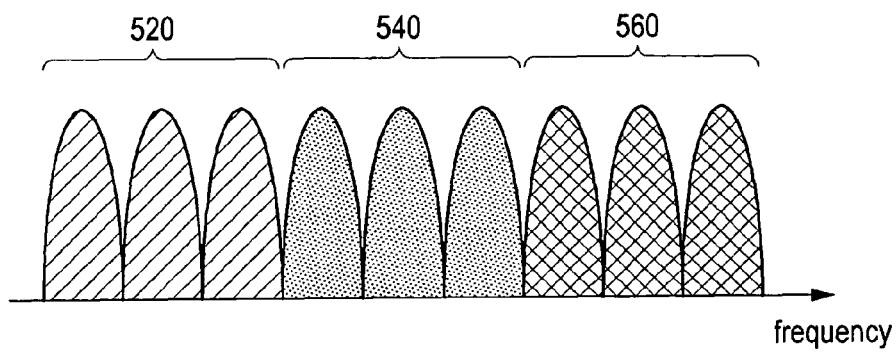
FIG. 5 illustrates sub carrier mapping according to an example embodiment of the present invention.

FIG. 5 illustrates sub carrier mapping according to an example embodiment of the present invention. Other embodiments and configurations are also within the scope of the present invention. As shown in FIG. 5, sub carriers may be orthogonal to each other. The number of sub carriers, N, may be determined based on design requirements. N may be larger than the chip number of the code sequence, e.g., M. The frequency domain code sequence may be mapped to sub carriers 520, which are continuous and locally located in the entire frequency band, (i.e., in a localized mode) as shown in FIG. 5. In at least one example embodiment of the present invention, a guard band 540 including at least one sub carrier may be allocated between the code sequence band 520 and other channel signal bands 560.

According to at least one example embodiment of the present invention, inter carrier interference (ICI) can be decreased by mapping a RACH signal to sub carriers in a localized mode. Such ICI can be further decreased by allocating a guard band between the RACH signal band and other channel signal bands.

Referring to FIG. 4, the first time domain converter 430 may convert the entire sub carriers into a time domain sequence to be transmitted. In at least one example embodiment of the present invention, the first time domain converter 440 may perform N-point Inverse Fast Fourier Transform (IFFT) to generate the time domain sequence. N may correspond to the number of discrete points used for IFFT and the number of sub carriers.

The CP inserting unit 450 may insert CP within the time domain sequence. The CP inserting unit 450 may select symbols (CP) that are positioned at a back side of the transmitted signal, and add the selected symbols (CP) to a front side of the transmitted signal. The CP may be for preventing any distortion caused by multi path fading. The number of CPs may depend on channel status.

Figure 6:
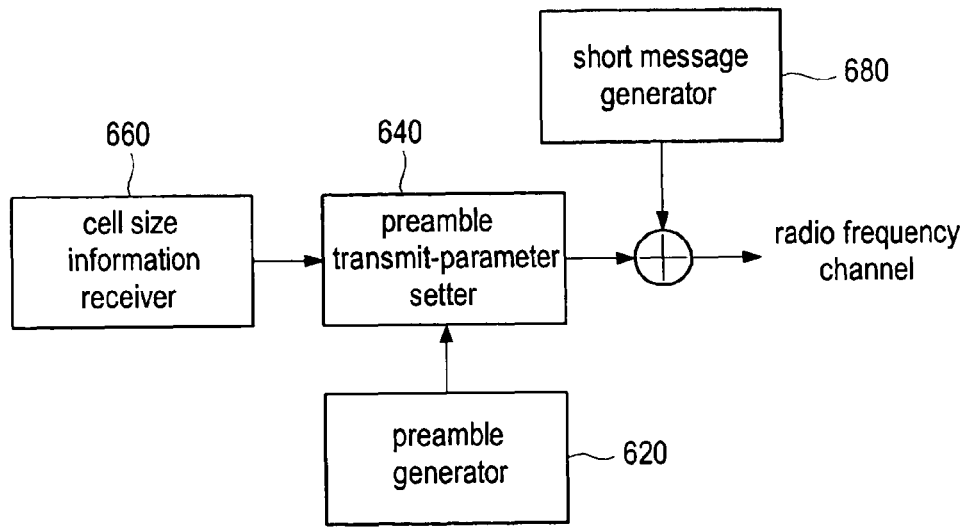
FIG. 6 illustrates an apparatus for transmitting a RACH signal according to an example embodiment of the present invention.

FIG. 6 illustrates an apparatus for transmitting a RACH signal according to an example embodiment of the present invention. Other embodiments and configurations are also within the scope of the present invention. As shown in FIG. 6, the apparatus may include a preamble generator 620 to generate a preamble of the RACH signal to be transmitted. In at least one example embodiment, the preamble generator 620 may be implemented by the transmitter (TX) of the SC-FDMA system 400, as shown in FIG. 4.

The apparatus may further include a preamble transmit-parameter setter 640 to set the transmit-parameter of the preamble based on the RACH signal detecting method or a status of the channel through which the RACH signal is transmitted. The transmit-parameter of the preamble may include at least one of a repetition number of the preamble, a presence of guard time, a position and duration of the guard time, or an intentional transmit delay.

In at least one example embodiment of the present invention, the preamble transmit-parameter setter 640 may set a repetition number of the preamble to be at least 2 when the RACH signal is detected in a frequency based method. The receiver can process the received RACH signal at a same timing with the data channel signal, although the received RACH signal may not be synchronized at the receiver since the preamble is fully included in the receive window of the receiver. Therefore, hardware complexity in the receiver can be decreased since the receiver does not require a separate FFT configuration for detecting the RACH signal. The process timing and receive window are described below with reference to FIG. 10.

In at least one example embodiment of the present invention, the preamble transmit-parameter setter 640 may set the repetition number of the preamble and the duration of the guard time based on a size of the cell covered by a base station. The guard time may be allocated between the RACH signal (preamble) and other data channel signals. The guard time may be for decreasing inter symbol interference (ISI), which may be due to the RACH signal and other data channel signals not being synchronized. For example, the preamble transmit-parameter setter 640 may increase the repetition number of the preamble or the duration of the guard time if the size of the cell is greater than a predetermined size. The preamble transmit-parameter setter 640 may also decrease the repetition number of the preamble or the duration of the guard time if the size of the cell is less than a predetermined size. Alternatively, the preamble transmit-parameter setter 640 may set several sections for transmitting the preamble and its corresponding guard time if the size of the cell is less than a predetermined size. As such, conflicting possibilities between the RACH signals received by the base station within a small-sized cell can be decreased. In such a case, the receiver may transmit an ACK to the mobile station whenever it receives the preamble of the RACH signal.

In at least one example embodiment of the present invention, the preamble transmit-parameter setter 640 may set an intentional transmit delay for the RACH signal. The intentional transmit delay may be set as 1 symbol duration, 2 symbol duration or 3 symbol duration, for example. The base station may have to adjust a receive timing offset to reflect an intentional transmit delay in case the mobile station transmits the RACH signal to the base station with the intentional transmit delay.

Figure 7:
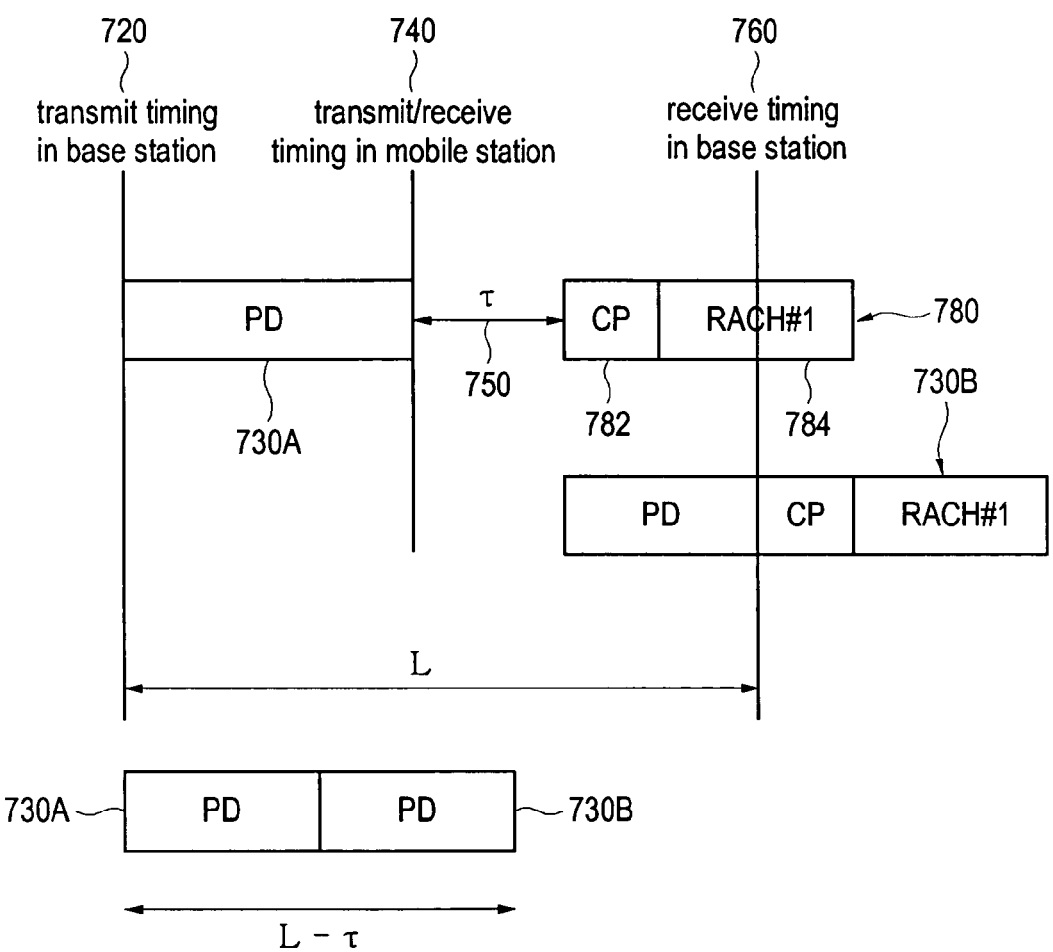
FIG. 7 illustrates a timing diagram in which a receive timing offset is adjusted in a base station when a mobile station transmits a RACH signal with an intentional transmit delay according to an example embodiment of the present invention.

FIG. 7 illustrates a timing diagram in which a receive timing offset is adjusted in a base station when a mobile station transmits a RACH signal with an intentional transmit delay according to an example embodiment of the present invention. Other embodiments and configurations are also within the scope of the present invention.

As shown in FIG. 7, the timing diagram includes a transmit timing 720 in the base station, a transmit/receive timing 740 in the mobile station and a receive timing 760 in the base station. The mobile station may transmit a RACH signal 780 with an intentional transmit delay, τ 750, depending on a propagation delay (PD) 730A between the transmit timing 720 in the base station and the receive timing 740 in the mobile station. In at least one example embodiment, the mobile station may obtain a PD 730 based on the size of the cell known to the mobile station or based on predetermined information received from the base station, as will be described below. The RACH signal 780 may include a CP 782 and a RACH#1 784 having a preamble. The RACH#1 784 may include a preamble transmitted for a first time. The RACH signal 780 shown in FIG. 7 is only an example, and embodiments of the present invention are not limited thereto. The RACH signal 780 having the intentional transmit delay, τ 750, may be received at the base station after the PD 730B elapses. Accordingly, adjustment time of the base station, L, between the transmit timing 720 and the receive timing 760 in the base station may be a sum of two PDs 730A and 730B and the intentional transmit delay 750. The adjustment time of the mobile station between transmit timing and receive timing may be L minus the intentional delay 750 (i.e., the sum of two PDs 730A and 730B).

As shown in FIG. 6, the apparatus may further include a cell size information receiver 660. The cell size information receiver 660 may receive the information related to the size of the cell covered by the base station. As discussed above, the preamble transmit-parameter setter 640 may set the transmit parameter of the preamble based on the cell size. If the preamble transmit-parameter setter 640 sets the transmit parameter of the preamble assuming that the cell size is maximum, this may be inefficient when considering utilizing communication resources. Accordingly, the base station may transmit information related to the cell size or a variety of options depending on the cell size to the mobile station. The cell size information receiver 660 may receive such information from the base station and transfer the information to the preamble transmit-parameter setter 640. Accordingly, the preamble transmit-parameter setter 640 may set the transmit-parameter of the preamble based on the information transferred from the cell size information receiver 660.

The apparatus shown in FIG. 6 may further include a short message generator 680. The short message generator 680 may generate a short message including information related to the mobile station. The apparatus may transmit the RACH signal with the short message to the base station.

Figure 8:
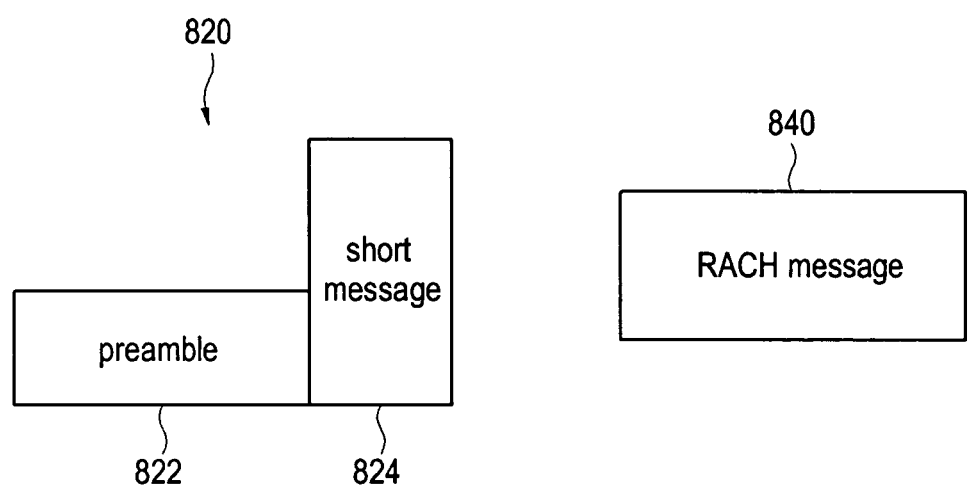
FIG. 8 illustrates an uplink RACH signal diagram according to an example embodiment of the present invention.

FIG. 8 illustrates an uplink RACH signal diagram according to an example embodiment of the present invention. Other embodiments and configurations are also within the scope of the present invention. As shown in FIG. 8, a RACH signal 820 may include a preamble 822 and a short message 824 including information related to the mobile station. The mobile station may transmit a RACH message 840 to the base station after it receives an ACK for the transmitted RACH signal from the base station or after a predetermined time elapses. As shown in FIG. 8, the short message 824 may be shorter than the RACH message 840. However, when received at the base station with the preamble 822, the short message 824 may include information usable for the base station to transmit a message to the mobile station. The short message 824 may have a size larger than 1 bit. The short message 824 may include priority of a call, transmitting power of the mobile station, performance of the mobile station, channel status, purpose of connection, mobile station's identification, or a repetition number of the preamble, for example.

The priority of a call may include an order of processing call requests (preamble 822) received by the base station, for example. As one example, if the base station receives a call with a high priority such as an emergency call, then the base station may process the call in a first place. The transmitting power of the mobile station may include information related to the transmitting power of the mobile station. For example, if the mobile station performs open-loop power control or power ramping, then the base station may not recognize an intrinsic transmitting power of the mobile station. In such a case, the base station may obtain information related to the transmitting power of the mobile station based on the short message received from the mobile station. Thus, the base station may utilize the information in processing the call connection or in scheduling the transmission of the signal to the mobile station.

The performance of the mobile station may include the bandwidth covered by the mobile station, transmission speed, etc. There may be a variety of mobile stations in a system. For example, the system may include a mobile station with 1.25 MHz bandwidth, a mobile station with 2.5 MHz bandwidth, and/or a mobile station with 5 MHz bandwidth in a system with 5 MHz bandwidth. However, the base station may not recognize the bandwidth of the mobile station only with a preamble. In such a case, the base station may obtain information related to performance of the mobile station based on the short message received from the mobile station and thus utilize the information to adjust the speed of the message transmitted to the mobile station.

The channel status may include a value related to the transmit delay or fading factor, for example. If the modulation method or channel coding method can be changed based on channel status, then the base station may select the modulation method and the channel coding method appropriate for the channel status received from the mobile station.

The purpose of the connection may include information related to which the call is for calling, being called or other purposes, for example. The mobile station's identification may include a unique number allocated to the mobile station that transmits the preamble, for example. The repetition number of the preamble may include a number of times the preamble is transmitted when the repetition number of the preamble is at least two, or when the preamble is repeatedly transmitted after a predetermined time, for example.

As such, the base station can utilize the information related to the performance of the mobile station that is included in the short message transmitted with the preamble to transmit a message to the mobile station without assuming that performance of the mobile station is a default or at a minimum.

Referring to FIG. 4, the receiver RX may include the CP deleting unit 460 to delete the CP from the received signal in order to extract a RACH signal. The receiver RX may further include the second frequency domain converter 470 to convert the extracted RACH signal into a frequency domain sequence. The second frequency domain converter 470 may correspond to the first time domain converter 440 in the transmitter TX. The second frequency domain converter 470 may perform N-point FFT to generate the frequency domain sequence. In such a case, N may be identical to the number of sub carriers.

The receiver RX may further include the sub carrier de-mapping unit 480 to extract the sub carriers mapped to the RACH signal of the total sub carriers. The sub carrier de-mapping unit 480 may correspond to the sub carrier mapping unit 430 in the transmitter TX. The sub carrier de-mapping unit 480 may extract the sub carriers based on a mapping mode in the sub carrier mapping unit 430 (e.g., the localized mode or the distributed mode). In at least one example embodiment, as shown in FIG. 5, the RACH signal may be mapped to the sub carriers 520 in a localized mode and the sub carrier de-mapping unit 480 may extract the sub carriers 520, which are continuous and locally located in the entire frequency band 500.

The receiver RX may further include the second time domain converter 490 to convert the extracted sub carriers mapped to the RACH signal into a time domain sequence. The second time domain converter 490 may correspond to the first frequency domain converter 420 in the transmitter TX. The second time domain converter 490 may perform M-point Inverse Discrete Fourier Transform (IDFT) to generate the time domain sequence. In such a case, M may be the same as the number of chips of the code sequence used for the preamble.

A code sequence transmitted as a preamble of the RACH signal and a receive delay may not be known to the receiver RX. Thus, the sub carriers extracted in the sub carrier de-mapping unit 490 may be used to detect the transmitted code sequence and the receive delay. In at least one example embodiment, such detection may include frequency based detection, time based detection and/or sliding matched filter based detection.

Figure 9:
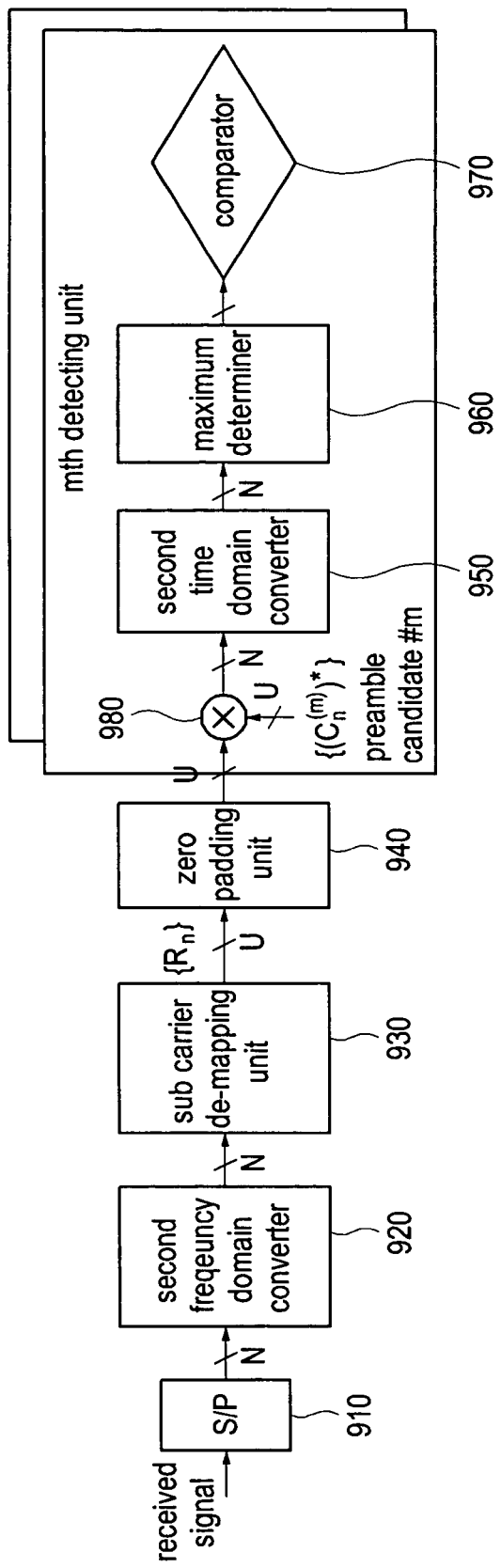
FIG. 9 illustrates a frequency based detector of a RACH signal according to an example embodiment of the present invention.

FIG. 9 illustrates a frequency based detector of a RACH signal according to an example embodiment of the present invention. Other embodiments and configurations are also within the scope of the present invention. The frequency based detector of a RACH signal may multiply the extracted RACH sub carriers (i.e., the frequency domain sequence) by a code sequence candidate in a frequency domain to generate a multiplied sequence and convert the multiplied sequence into a time domain sequence. The time domain sequence may become a convolution sequence of the extracted RACH sequence and the code sequence candidate by time/frequency conversion characteristics.

As shown in FIG. 9, the frequency based detector of a RACH signal may include a serial to parallel (S/P) converter 910. The serial to parallel converter 910 may convert the received signal, which is sampled and transferred serially from a receiving unit (not shown) into parallel data with a predetermined size, N.

Figure 10:
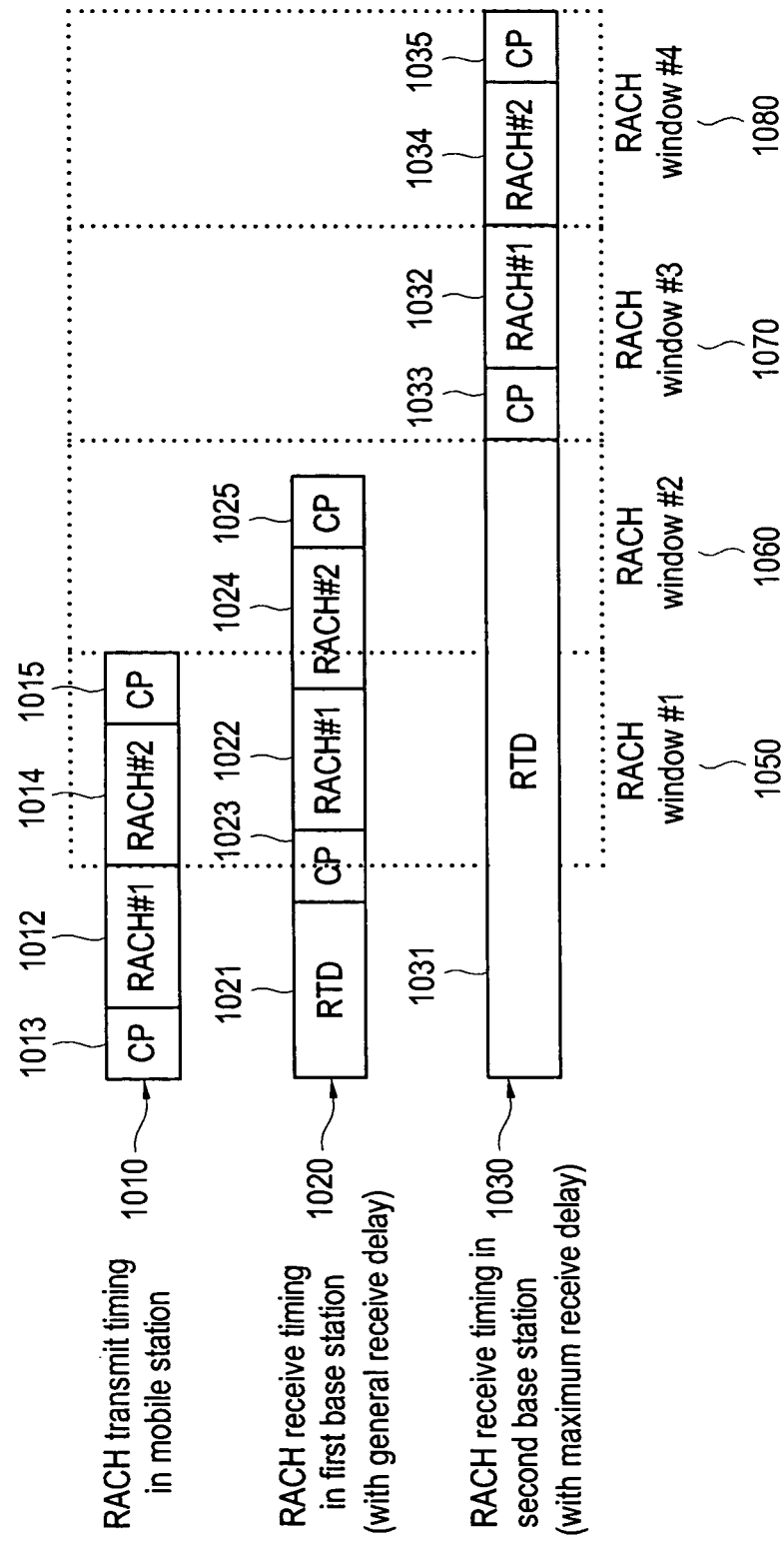
FIG. 10 illustrates a RACH signal frame used for the frequency based detector of a RACH signal according to an example embodiment of the present invention.

FIG. 10 illustrates a RACH signal frame for frequency based detection of a RACH signal according to an example embodiment of the present invention. Other embodiments and configurations are also within the scope of the present invention. FIG. 10 shows a RACH signal transmit timing 1010 in the mobile station, a RACH signal receive timing 1020 in a first base station with a general receive delay, and a RACH signal receive timing 1030 in a second base station with a maximum receive delay (assuming that the cell size is 3 km). As shown in FIG. 10, a preamble may be transmitted twice, such as RACH#1 1012 and RACH#2 1014. The repetition number, 2, is only one example as the repetition number may be larger than 2 depending on a design option. As shown in FIG. 10, the transmitted RACH signal 1010 may be received at the base station after a receive time delay (RTD) 1021 or 1031. The base station may use a first RACH window 1050, a second RACH window 1060, a third RACH window 1070 or a fourth RACH window 1080 to receive the transmitted RACH signal 1010. In at least one example embodiment of the present invention, the first base station may use the first RACH window 1050 to detect the transmitted RACH signal 1010. The second base station may use the third RACH window 1070 or the fourth RACH window 1080 to detect the transmitted RACH signal 1010.

As such, since a preamble is received at least twice, the receiver can process the received RACH signal at a same timing with the other data channel signals (e.g., perform conversion on the received RACH signal from frequency domain to time domain with other data channel signals in the second frequency domain converter 470). This is because a window (e.g., the first RACH window 1050) includes a full RACH signal having parts of repeated preambles (e.g., RACH#1 1022 and RACH#2 1024), although the RACH signal is not synchronized with the receiver since the preamble is repeatedly transmitted. Thus, the receiver can perform FFT of the received RACH signal with the other data channel signals at a same time. As such, receiver complexity can be remarkably decreased without separate timing for converting the received RACH signal with unknown delay into a frequency domain sequence. In at least one example embodiment of the present invention, CPS 1013, 1015, 1023, 1025, 1033 and 1035 may be removed from the RACH signal. In such a case, a separate timing may be needed for the RACH signal processing.

With reference to FIG. 9, the frequency based detector of the RACH signal may further include a second frequency domain converter 920 and a sub carrier de-mapping unit 930. The second frequency domain converter 920 and the sub carrier de-mapping unit 930 may be identical and/or similar to the second frequency domain converter 470 and the sub carrier de-mapping unit 480 shown in FIG. 4, respectively.

As shown in FIG. 9, the frequency based detector of the RACH signal may further include a zero padding unit 940 coupled to the sub carrier de-mapping unit 930. The zero padding unit 940 may pad zeros to the remnant frequency band (e.g., sub carriers) excluding the RACH signal band. This may match the time domain sequence converted from the extracted sub carriers with a transmit speed of a symbol.

As shown in FIG. 9, the frequency based detector of the RACH signal may further include a second time domain converter 950, a maximum determiner 960 and a comparator 970. The second time converter 950 may convert the output sequence of the zero padding unit 940 into a time domain detect sequence. The maximum determiner 960 may determine a maximum value of the detect sequence. The comparator 970 may compare the maximum value with a threshold to determine the presence of the code sequence candidate and a receive delay.

The second time domain converter 950 may receive the output signal of a combiner 980. The combiner 980 may multiply the frequency domain RACH signal (sub carriers) extracted in the sub carrier de-mapping unit 930 by a conjugate sequence of the code sequence candidate in a frequency domain to generate a multiplied sequence. In at least one example embodiment, the number of the code sequence candidates (labeled as a code sequence #m), M, may be a number of code sequences for a preamble in the base station. The detecting performance may be improved as the number of the code sequences used in the base station increases. In at least one example embodiment of the present invention, the second time domain converter 950 may perform N-point IFFT to generate a time domain sequence. In such a case, N may be the same as the number of sub carriers.

The comparator 970 may determine that the code sequence candidate is present if the maximum value determined in the maximum determiner 960 exceeds the threshold. Then the comparator 970 may calculate the receive delay based on the position of the maximum value within the detect sequence. In at least one example embodiment of the present invention, the comparator 970 may determine the receive delay as the position of the maximum value within the detect sequence.

The frequency based detector of the RACH signal may have advantages in that it can use FFT/IFFT units provided in an OFDMA receiver to detect the RACH signal. As such, receiver complexity can be remarkably decreased since the frequency based detector of the RACH signal utilize a configuration of the receiver to detect the transmitted code sequence and the receive delay.

Figure 11:
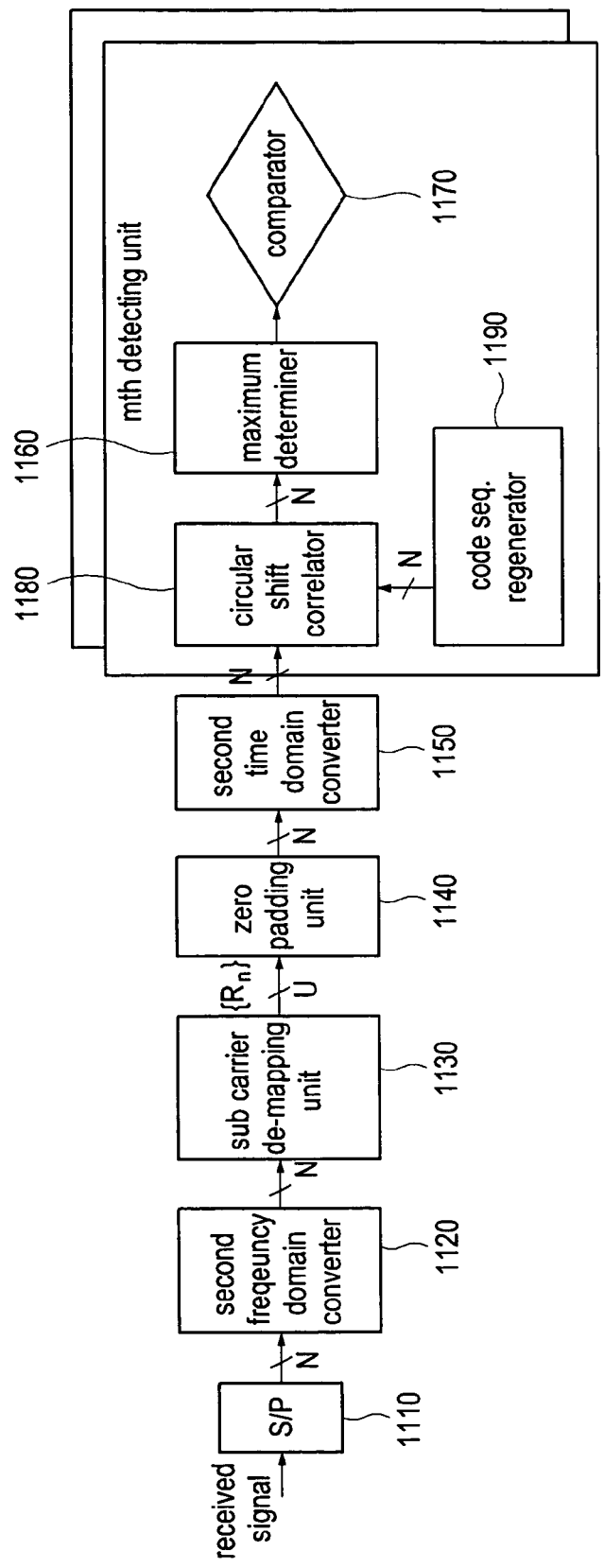
FIG. 11 illustrates a time based detector of a RACH signal according to an example embodiment of the present invention.

FIG. 11 illustrates a time based detector of a RACH signal according to an example embodiment of the present invention. Other embodiments and configurations are also within the scope of the present invention. The time based detector of the RACH signal may perform a circular shift correlation of the received signal and a code sequence candidate in the time domain to generate a detect sequence.

As shown in FIG. 11, the time based detector of the RACH signal may include a serial to parallel (S/P) converter 1110. The serial to parallel converter 1110 may convert the received signal, which is sampled and transferred serially from a receiving unit (not shown) into parallel data with a predetermined size, N.

Figure 12:
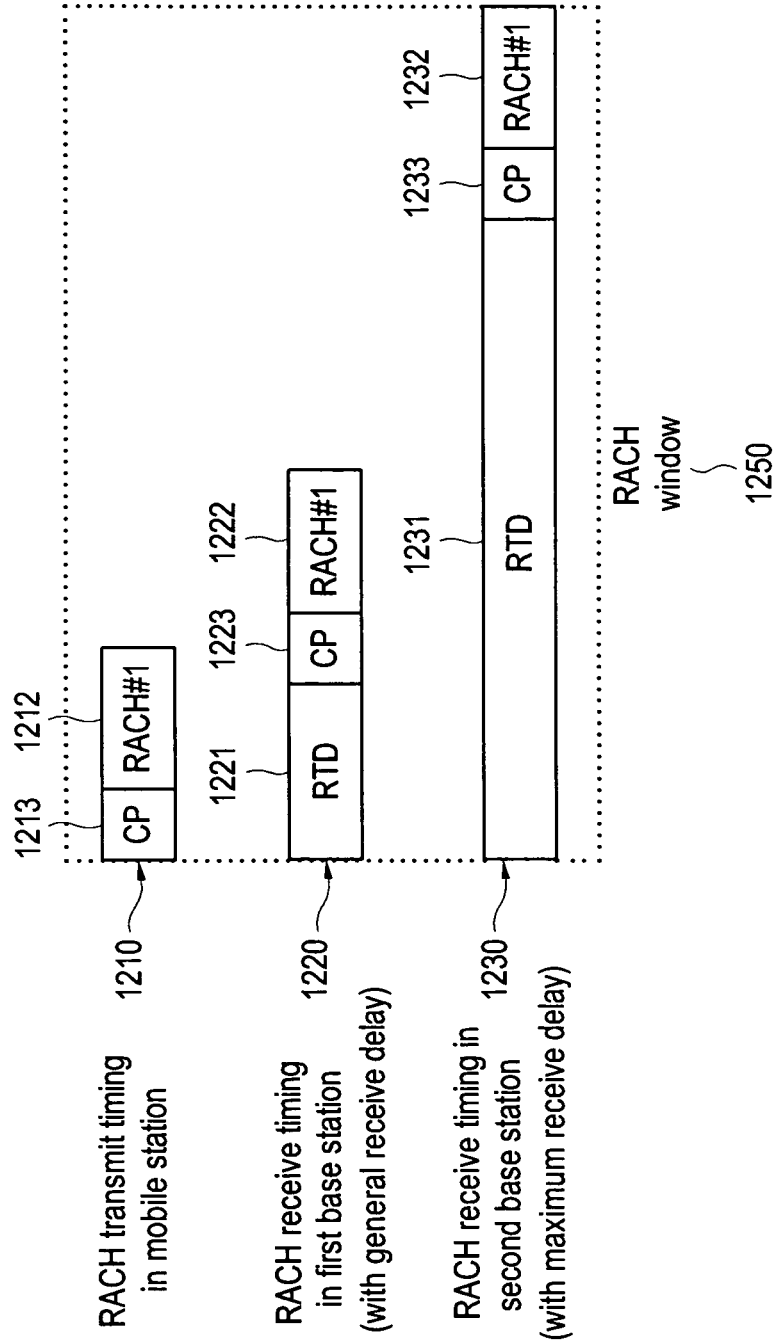
FIG. 12 illustrates a RACH signal frame for the time based detector of a RACH signal according to an example embodiment of the present invention.

FIG. 12 illustrates a RACH signal frame for the time based detector of the RACH signal according to an example embodiment of the present invention. Other embodiments and configurations are also within the scope of the present invention. FIG. 12 shows a RACH signal 1210 transmit timing in the mobile station, a RACH signal 1220 receive timing in a first base station with a general receive delay, and a RACH signal 1230 receive timing in a second base station with a maximum receive delay (assuming the cell size is 3 km). As shown in FIG. 12, a preamble may be transmitted once such as RACH#1 1212. The transmitted count, 1, is only one example, and the transmitted count may be larger than 1 depending on a design option. As shown in FIG. 12, the transmitted RACH signal 1210 may be received at the base station after a receive time delay (RTD) 1221 or 1231. The base station may adjust the size of a RACH window 1250 depending on the cell size covered by the base station, for example.

As such, the mobile station may not need to repeatedly transmit a preamble since the receiver adjusts the size of the RACH window 1250 in order to detect the RACH signal. In at least one example embodiment of the present invention, CP 1213 may be zeros. Alternatively, CPS 1213, 1223 and 1233 may be removed from the RACH signal. In such a case, a separate timing for RACH signal processing may be required.

Referring now to FIG. 11, the time based detector of the RACH signal may further include a second frequency domain converter 1120, a sub carrier de-mapping unit 1130 and a zero padding unit 1140. The second frequency domain converter 1120, the sub carrier de-mapping unit 1130 and the zero padding unit 1140 may be identical and/or similar to the second frequency domain converter 920, the sub carrier de-mapping unit 930 and the zero padding unit 940 shown in FIG. 9, respectively.

As shown in FIG. 11, the time based detector of the RACH signal may further include a second time domain converter 1150 coupled to the zero padding unit 1140. The second time domain converter 1150 may convert the output signal of the zero padding unit 1150 into a time domain sequence. In at least one example embodiment of the present invention, the second time domain converter 1150 may perform N-point IFFT to generate a time domain sequence. In such a case, N may be the same as the number of sub carriers.

As further shown in FIG. 11, the time based detector of the RACH signal may also include a circular shift correlator 1180 to generate a detect sequence, a maximum determiner 1160 to determine a maximum value of the detect sequence, and a comparator 1170 to compare the maximum value with a threshold to determine the presence of the code sequence candidate and a receive delay. The maximum determiner 1160 and the comparator 1170 may be identical and/or similar to the maximum determiner 960 and the comparator 970 shown in FIG. 9, respectively.

The circular shift correlator 1180 may perform circular shift correlation of the time domain sequence generated in the second frequency domain converter 1150 and a regenerated code sequence candidate to generate a detect sequence. A code sequence regenerator 1190 may have a code sequence candidate that has undergone a process through which the transmitted code sequence went to. Once generated, the regenerated code sequence candidate may be utilized whenever the time based detector of the RACH signal shown in FIG. 11 detects the transmitted RACH signal without being generated again.

Figure 13:
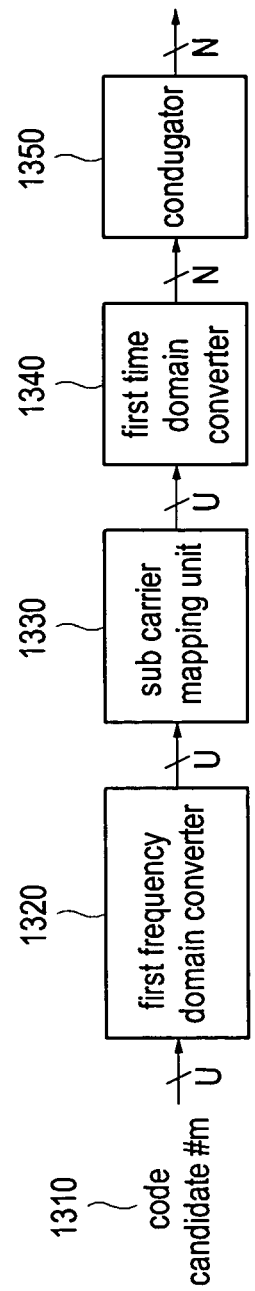
FIG. 13 illustrates a code sequence regenerator for time based detection of a RACH signal according to an example embodiment of the present invention.

FIG. 13 illustrates a code sequence regenerator for a time based detector of a RACH signal according to an example embodiment of the present invention. Other embodiments and configurations are also within the scope of the present invention. The code sequence regenerator may include a first frequency domain converter 1320 to convert a code sequence 1301 into a frequency domain sequence by performing M-point DFT, for example. The code sequence regenerator may further include a sub carrier mapping unit 1330 to map the frequency domain sequence to the sub-frequency band of the entire band in a same mode with the transmitter (sub carrier mapping).

The code sequence regenerator may also include a first time domain converter 1340 to convert the entire band into a time domain sequence by performing N-point IFFT, for example. In at least one example embodiment, the first frequency domain converter 1320, the sub carrier mapping unit 1330 and the first time domain converter 1340 may be identical to the first frequency domain converter 420, the sub carrier mapping unit 430 and the first time domain converter 440 shown in FIG. 4, respectively. However, the sub carrier mapping unit 1330 in the code sequence regenerator 1300 may allocate zeros to remnant bands (the remnant sub carriers) excluding the sub frequency band mapped to the frequency domain code sequence.

As shown in FIG. 13, the code sequence regenerator may further include a conjugator 1350 coupled to the first time domain converter 1340. The conjugator 1350 may convert the output signal of the first time domain converter 1340 into its conjugate sequence for circular shift correlation with the received RACH signal.

As such, the time based detector of the RACH signal may have advantages in that it can use a FFT unit provided in an OFDM receiver to detect the RACH signal. The transmitter may not need to repeatedly transmit a preamble as discussed above.

Figure 14:
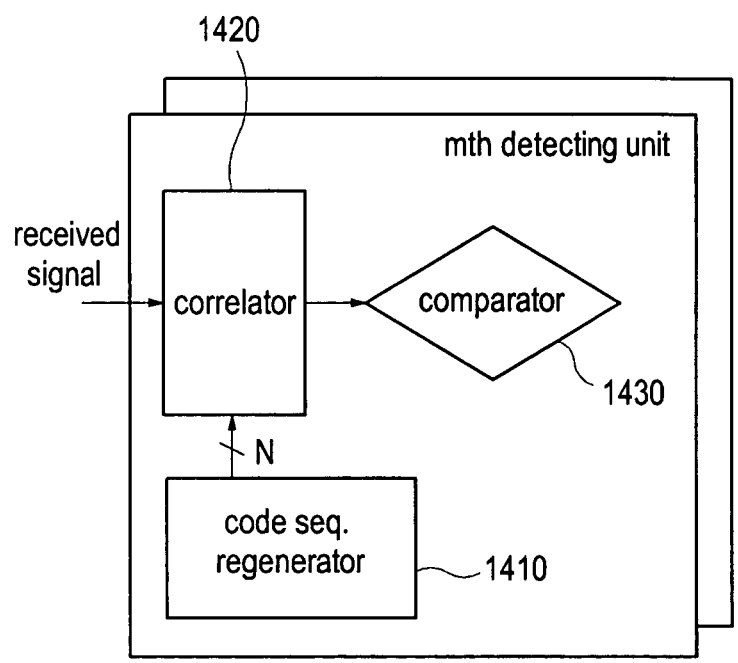
FIG. 14 illustrates a sliding matched filter based detector of a RACH signal according to an example embodiment of the present invention.

FIG. 14 illustrates a sliding matched filter based detector of a RACH signal according to an example embodiment of the present invention. Other embodiments and configurations are also within the scope of the present invention. The sliding matched filter based detector of the RACH signal may have a configuration similar to the RACH detector of the CDMA system. The sliding matched filter based detector of the RACH signal may calculate the correlation of the received signal and a code sequence candidate without converting the received signal into the frequency domain.

As shown in FIG. 14, the sliding matched filter based detector of the RACH signal may include a code sequence regenerator 1410, which may be identical and/or similar to the code sequence regenerator 1190 or 1300 shown in FIGS. 11 and 13. The sliding matched filter based detector of the RACH signal may further include a correlator 1420 to perform the sliding shift correlation of the received signal and a regenerated code sequence candidate generated in the code sequence regenerator 1410 to generate a detect sequence. The sliding matched filter based detector of the RACH signal may further include a comparator 1430 to compare a maximum value of the detect sequence with a threshold. The comparator 1430 may determine that the code sequence candidate is present if the maximum value exceeds the threshold. Then the comparator 1430 may calculate a receive delay based on the position of the maximum value within the detect sequence.

As such, the sliding matched filter based detector of the RACH signal may not require converting the receive signal into a frequency domain sequence since it performs the sliding shift correlation in the sampling timing. Thus, it may not require transmitting a preamble repeatedly to obtain FFT timing.

Figure 15:
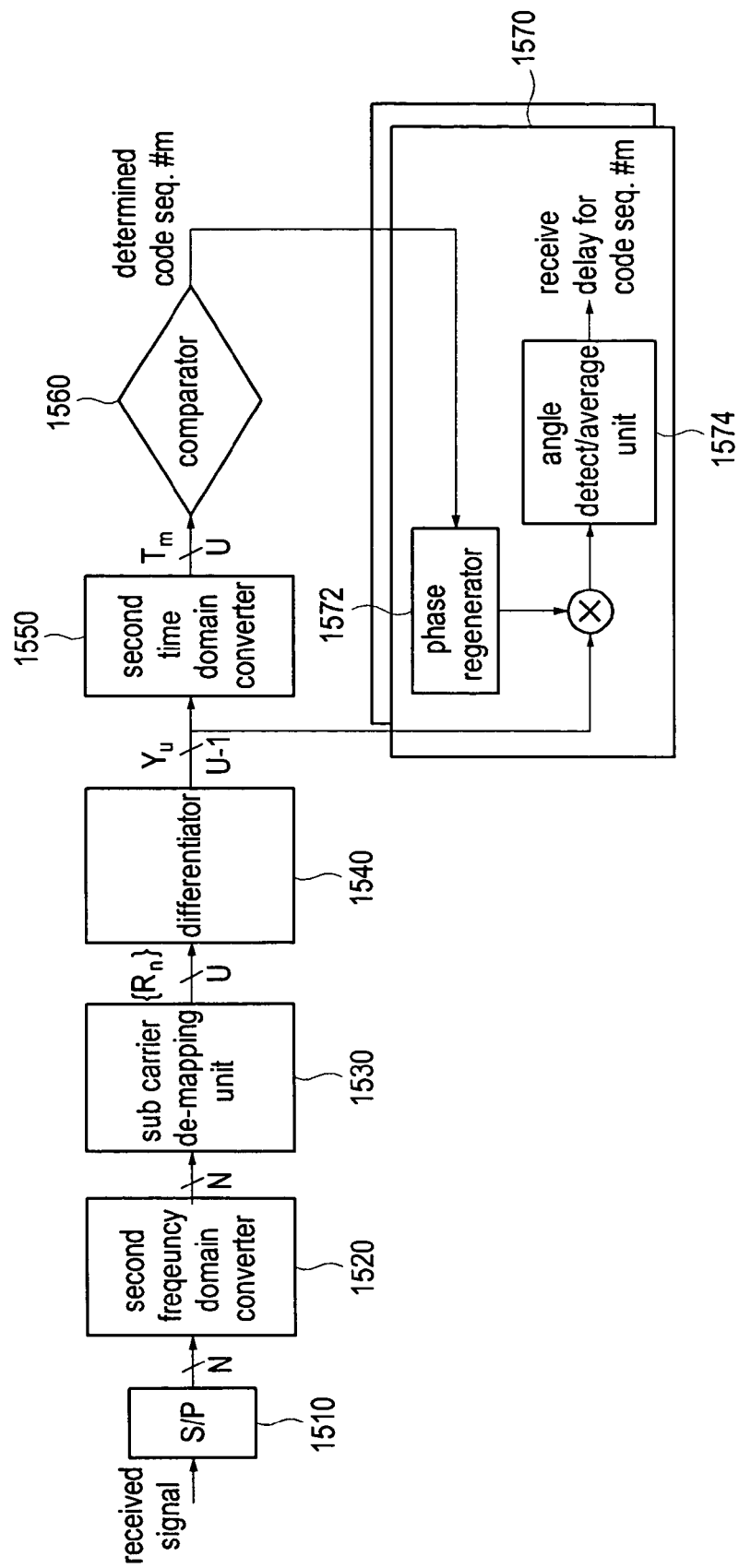
FIG. 15 illustrates a detector of a RACH signal including a CAZAC code sequence for a preamble according to an example embodiment of the present invention.

FIG. 15 illustrates a detector of a RACH signal including a CAZAC code sequence for a preamble according to an example embodiment of the present invention. Other embodiments and configurations are also within the scope of the present invention. The detector 1500 may use characteristics of the CAZAC code sequence in order to remarkably decrease complexity of the frequency based detector of the RACH signal.

The detector may include a serial to parallel converter (S/P) 1510. The serial to parallel converter 1510 may convert the received signal, which is sampled and transferred serially from a receiving unit (not shown) into parallel data with a predetermined size, N. A RACH signal frame received at the receiving unit may be the same as the RACH signal frame shown in FIG. 10.

The detector may further include a second frequency domain converter 1520 and a sub carrier de-mapping unit 1530. The second frequency domain converter 1520 and the sub carrier de-mapping unit 1530 may be identical and/or similar to the second frequency domain converter 920 and the sub carrier de-mapping unit 930 shown in FIG. 9, respectively.

As shown in FIG. 15, the detector may further include a differentiator 1540 coupled to the sub carrier de-mapping unit 1530. The differentiator 1540 may perform differentiation to generate a differential sequence. The differential sequence $Y_n$ may be depicted by the following Equation 1:

$$Y_n = R_n \cdot R_{n+1}^*$$
$$= \exp(-j2\pi d/N)\exp(-j4\pi m/U)\exp(-j2\pi m(n-1)/U),$$
$$n = 1, 2, \ldots, U-1,$$

where, U is a size of an output signal vector of the sub carrier de-mapping unit 1530, $R_n$ is on n'th value of the output signal vector, m is an index of the transmitted CAZAC code sequence, and d is a receive delay.

As shown in FIG. 15, the detector may further include a second time domain converter 1550 coupled to the differentiator 1550. The second time domain converter 1550 may generate a detect sequence. The second time domain converter 1550 may perform U-point IFFT, where U is the size of an output signal vector of the sub carrier de-mapping unit 1530.

FIG. 16 illustrates a second time domain converter for detection of a RACH signal including a CAZAC code sequence for a preamble according to an example embodiment of the present invention. Other embodiments and configurations a re also within the scope of the present invention. The second time domain converter shown in FIG. 16 may perform U-point FFT of the differential sequence, $Y_n$, to generate a detect sequence, $T_m$. The detect sequence, $T_m$, may be depicted by the following Equation 2:

$$T_m = \sum_{n=0}^{U} Y_n e^{j2\pi mn/U}, m = m_1, m_2, \ldots, m_M$$

where, $m = m_1, m_2, \ldots, m_M$ are indices of the CAZAC code sequence candidates. The calculation complexity may decrease as the scope of the CAZAC code sequence candidates decreases to the CAZAC code sequences used in the corresponding base station.

As shown in FIG. 15, the detector may further include a comparator 1560 coupled to the second time domain converter 1550, and a receive delay calculator 1570 coupled to the comparator 1560. The comparator 1560 may compare a maximum value of the detect sequence, $T_m$, with a threshold to determine the transmitted code sequence (i.e., the index of the CAZAC code sequence). Then the receive delay calculator 1570 may calculate the receive delay, d, with respect to the determined CAZAC code sequence based on Equation 1.

In at least one example embodiment of the present invention, the receive delay calculator 1570 may include a phase regenerator 1572 and an angle detect/average unit 1574. The phase regenerator 1572 may regenerate a phase with regard to the determined CAZAC sequence. The angle detect/average unit 1474 may calculate the receive delay, d, based on a correlation sequence of the regenerated phase and the differential sequence generated in the differentiator 1540. The angle detect/average unit 1574 may detect angles and average the detected angles from the correlation sequence signal.

The detector of the RACH signal including a CAZAC code sequence for a preamble may have advantages in that the detector may not need to perform conversion or correlation to generate a detect sequence for each code sequence candidate. The detector detects the transmitted code sequence and the receive delay based on the CAZAC code sequence characteristics with a simple receiver configuration.

Figure 17:
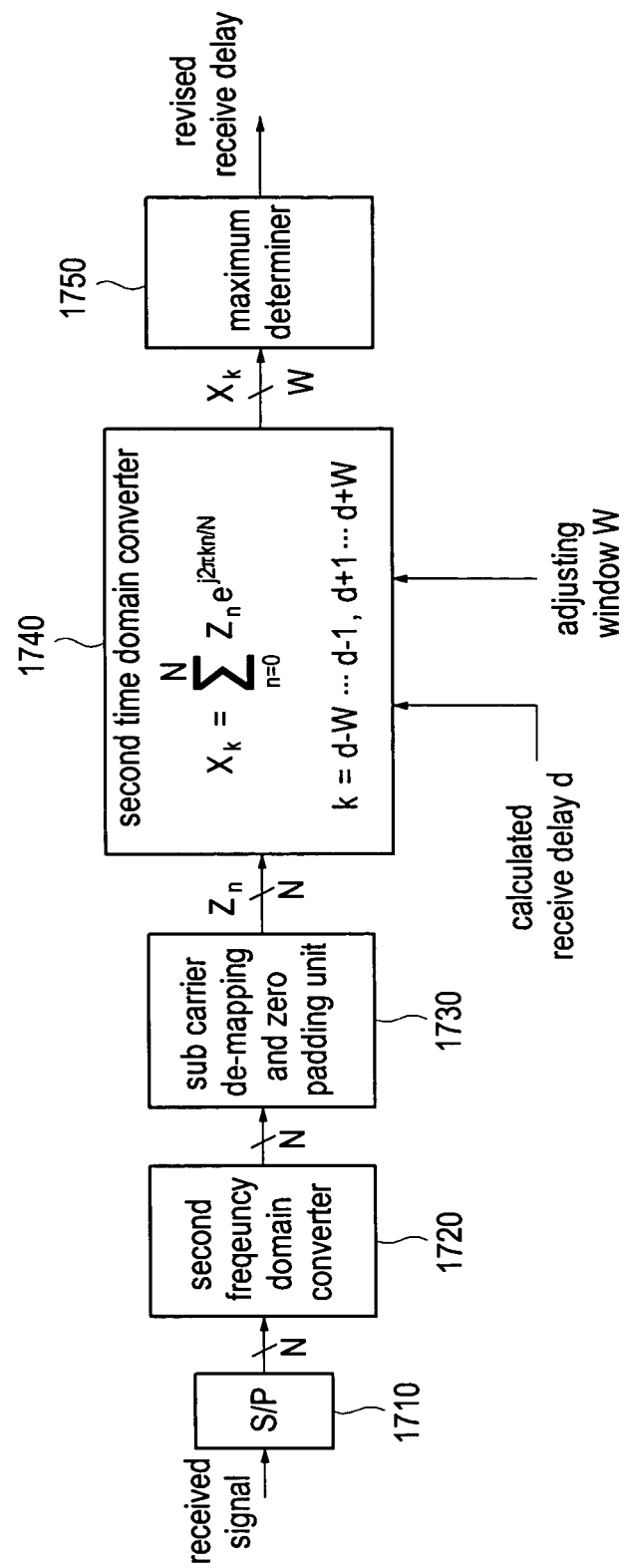
FIG. 17 illustrates a receive delay reviser according to an example embodiment of the present invention.

FIG. 17 illustrates a receive delay reviser according to an example embodiment of the present invention. Other embodiments and configurations are also within the scope of the present invention. The receive delay reviser may revise the receive delay, d, for a more accurate determination (shown in FIG. 15).

The receive delay reviser may include a serial to parallel (S/P) converter 1710. The serial to parallel converter 1710 may convert the received signal, which is sampled and transferred serially from a receiving unit (not shown) into parallel data with a predetermined size, N. In at least one example embodiment of the present invention, a RACH signal frame received at the receiving unit may be the same as the RACH signal frame shown in FIG. 10.

As shown in FIG. 17, the receive delay reviser may further include a second frequency domain converter 1720. The second frequency domain converter 1720 may be identical and/or similar to the second frequency domain converter 920 shown in FIG. 9. The receive delay reviser may further include a sub carrier de-mapping and zero padding unit 1730 coupled to the second frequency domain converter 1720. The sub carrier de-mapping and zero padding unit 1730 may be identical and/or similar to the combination of the sub carrier de-mapping unit 930 and the zero padding unit 940 shown in FIG. 9.

The receive delay reviser may further include a second time domain converter 1740 coupled to the sub carrier de-mapping and zero padding unit 1730. The second time domain converter 1740 may convert the output signal of the sub carrier de-mapping and zero padding unit 1730 into a time domain receive delay detect sequence. The second time domain converter 1740 may perform N-point IFFT to generate the receive delay detect sequence. In such a case, N may be the number of sub carriers. The receive delay detect sequence may have time indices of which an upper limit is later than the determined receive delay d, by a predetermined time (e.g., W) and a down limit is faster than the determined receive delay d by a predetermined time (e.g., W). Alternatively, the time duration between the determined receive delay d and an upper limit may be different from the time duration between the determined receive delay d and a down limit. The receive delay reviser may further include a maximum determiner 1750 as shown in FIG. 17. The maximum determiner 1750 may determine a maximum value of the receive delay detect sequence to adjust the receive delay d. In at least one example embodiment of the present invention, the maximum determiner 1750 may adjust the receive delay d based on the position of the maximum value within the receive delay detect sequence.

As shown in FIG. 17, the receive delay reviser may utilize components of an OFDMA receiver to implement the second frequency domain converter 1720 and the sub carrier de-mapping and zero padding unit 1730. Thus, calculation complexity may not particularly increase. Further, the receive delay can be calculated simply and adjusted more accurately depending on a design option. Therefore, flexibility and scalability for implementing a receiver may be enhanced.

Figure 18:
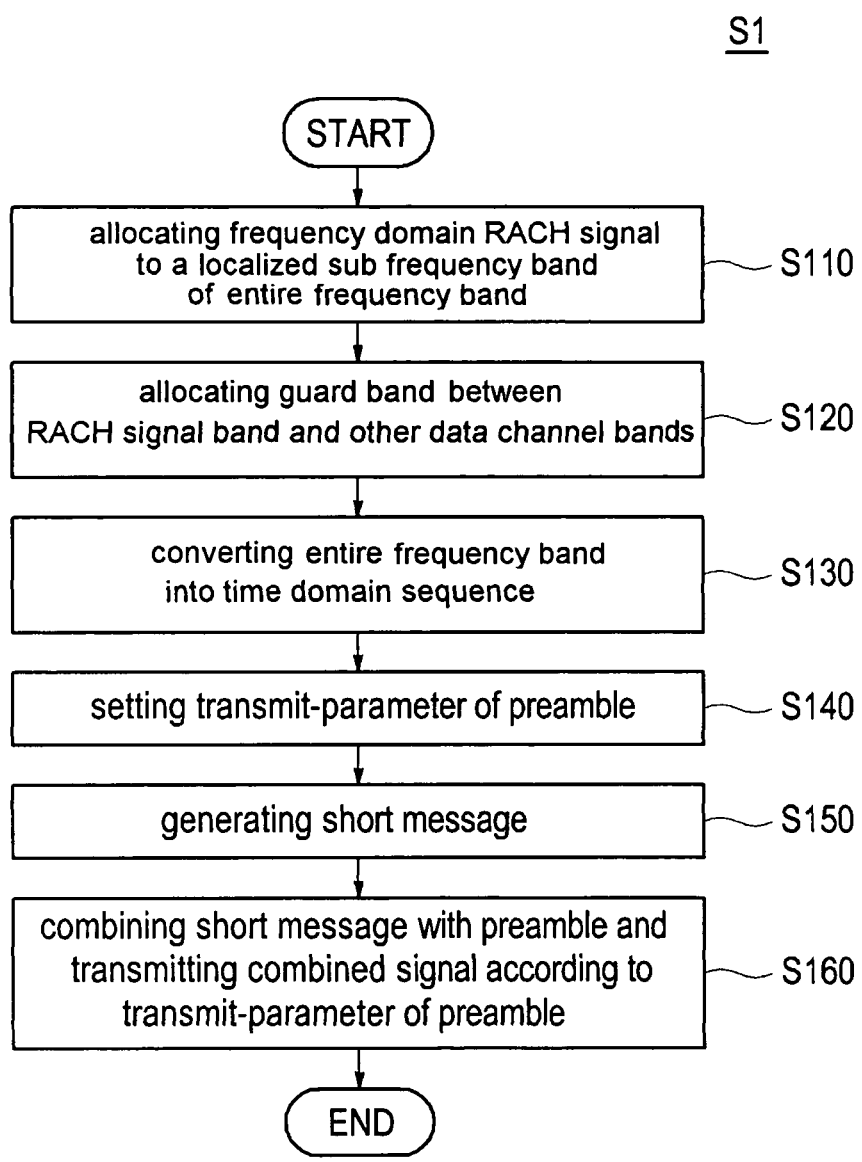
FIG. 18 illustrates a flow chart for a RACH signal transmitting method according to an example embodiment of the present invention.

FIG. 18 illustrates a flow chart for a RACH signal transmitting method according to an example embodiment of the present invention. Other operations, orders of operations and configurations are also within the scope of the present invention. In operation S110, a frequency domain RACH signal may be mapped to a localized sub frequency band of an entire frequency band available to the SC-FDMA system. As shown in FIG. 4, the RACH signal (preamble) may be converted into a frequency domain sequence, for example, by M-point DFT in the first frequency domain converter 420. Then the frequency domain sequence may be mapped to the sub carriers 520 in a localized mode as shown in FIG. 5. In operation S120, a guard band may be allocated between the RACH signal band and other channel signal bands. As shown in FIG. 5, a guard band 540 including at least one sub carrier may be allocated between the RACH signal band 520 and the other channel signal bands 560. In operation S130, the entire frequency band may be converted into a time domain sequence. As shown in FIG. 4, the entire frequency band may be converted into a time domain sequence, for example, by N-point IFFT in the first time domain converter 440. Then, the transmit-parameter of the preamble may be set based on information related to size of a cell covered by the base station (operation S140). In at least one embodiment, the transmit-parameter of the preamble may include at least one of a repetition number of the preamble, presence of guard time, a position and duration of the guard time, or an intentional transmit delay. In operation S150, a short message including information related to the mobile station may be generated. In at least one example embodiment, information related to the mobile station may include at least one of priority of a call, transmitting power of the mobile station, performance of the mobile station, channel status, purpose of connection, the mobile station's identification, or a repetition number of the preamble, for example. Then, the short message may be combined with the preamble to form a signal in a transmitted form. The formed signal may be transmitted to a base station according to the transmit-parameter of the preamble (operation S160).

Figure 19:
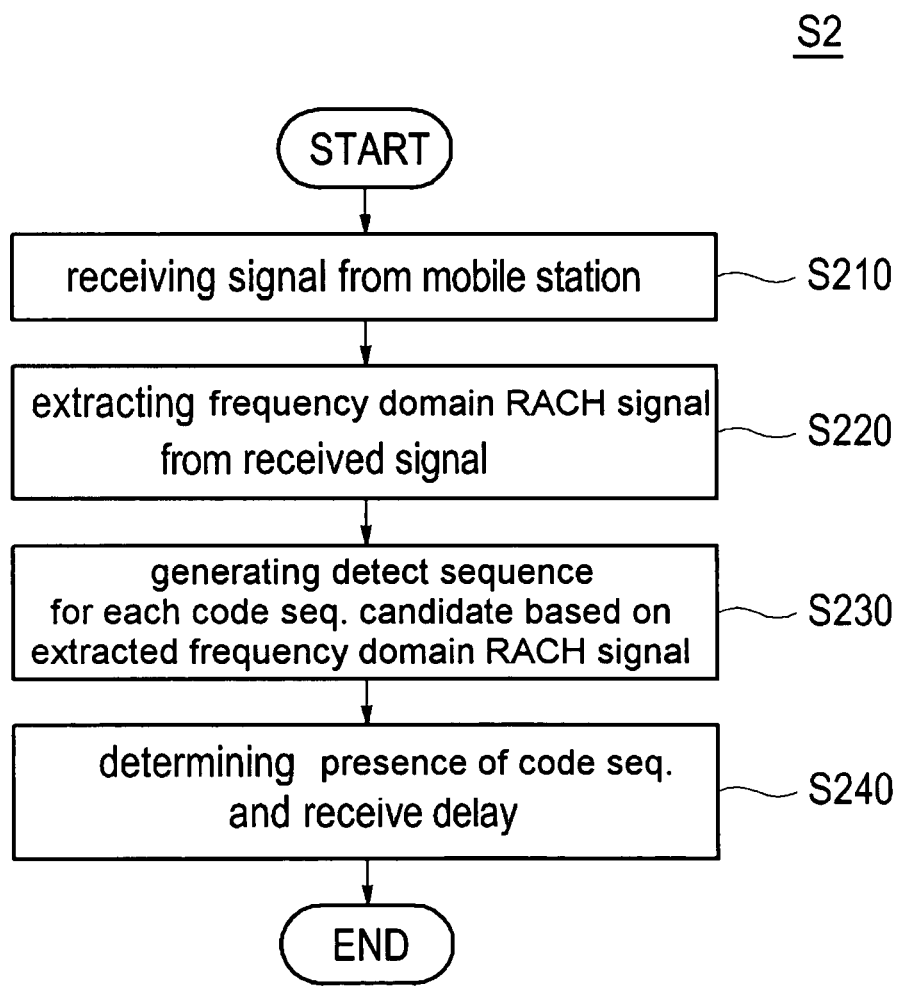
FIG. 19 illustrates a flow chart for a RACH signal detecting method according to an example embodiment of the present invention.

FIG. 19 illustrates a flow chart for a RACH signal detecting method according to an example embodiment of the present invention. Other operations, orders of operations and configurations are also within the scope of the present invention. In operation S210, a signal may be received from a mobile station. Then, a frequency domain RACH signal may be extracted from the received signal (operation S220). As shown in FIGS. 9 and 11, the serially received signal may be converted into parallel data with a size N in the serial to parallel converter 910 or 1110, and converted into a frequency domain sequence, for example, by N-point FFT in the second frequency domain converter 920 or 1120. Then, the sub-frequency band (sub carriers) mapped to the frequency domain RACH signal may be extracted in the sub carrier de-mapping unit 930 or 1130. As shown in FIG. 5, the sub carriers 520 of the N total sub carriers 500 mapped to the frequency domain RACH signal in a localized mode may be extracted. In operation S230, a detect sequence for each code sequence candidate may be generated based on the extracted frequency domain RACH signal. In at least one example embodiment of the present invention, the detect sequence may be generated in a frequency based method as shown in FIG. 9. In at least another example embodiment of the present invention, the detect sequence may be generated in the time based method as shown in FIG. 11. In operation S240, the presence of code sequence and a receive delay may be determined based on the detect sequence. As shown in FIGS. 9 and 11, a maximum value of the detect sequence may be determined. Then if the maximum value exceeds a threshold, it may be determined that the code sequence candidate is present. Further, the receive delay may be determined based on the position of the maximum value within the detect sequence.

Figure 20:
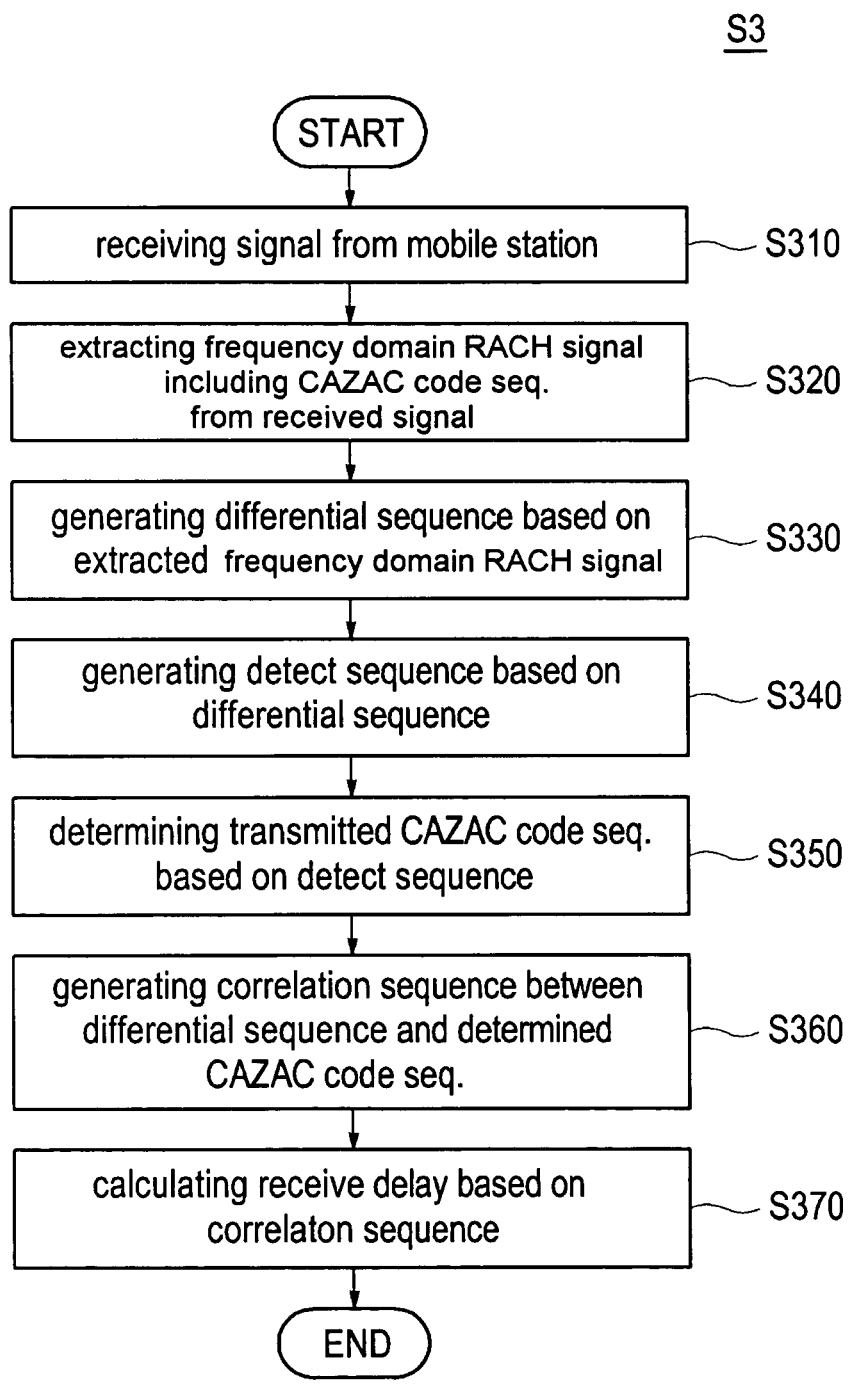
FIG. 20 illustrates a flow chart for a detecting method of a RACH signal including a CAZAC code sequence for a preamble according to an example embodiment of the present invention.

FIG. 20 illustrates a flow chart for a detecting method of a RACH signal including a CAZAC code sequence for a preamble according to an example embodiment of the present invention. Other operations, orders of operations and configurations are also within the scope of the present invention. In operation S310, a signal may be received from a mobile station. Then the frequency domain RACH signal including a CAZAC code sequence may be extracted from the received signal (operation S320). As shown in FIGS. 15 and 17, the serially received signal may be converted to parallel data with a size N in the serial to parallel converter 1510 or 1710, and converted into a frequency domain sequence, for example, by N-point FFT in the second frequency domain converter 1520 or 1720. Then the sub-frequency band mapped to the frequency domain RACH signal may be extracted in the sub carrier de-mapping unit 1530 or 1730. As shown in FIG. 5, the sub carriers 520 of the N total sub carriers 500 mapped to the frequency domain RACH signal in a localized mode may be extracted. Then a differential sequence may be generated based on the extracted frequency domain RACH signal (operation S330). As shown in FIG. 15, the differential sequence may be generated by performing Equation 1 on the extracted frequency domain RACH signal in the differentiator 1540, for example. In operation S340, the differential sequence may be converted into a time domain detect sequence. The detect sequence may be generated in the second time domain converter 1550 as shown in FIG. 15 or the apparatus shown in FIG. 16. Then a maximum value of the detect sequence may be compared with a threshold to determine the transmitted code sequence (operation S350). As shown in FIG. 15, if the maximum value exceeds a threshold, then the transmitted sequence may be determined to be a CAZAC code sequence having an index corresponding to the position of the maximum value within the detect sequence. In operation S360, the correlation of the CAZAC code sequence determined in operation S350 and the differential sequence generated in operation S330 may be performed to generate a correlation sequence. Then a receive delay may be calculated based on the correlation sequence (operation S370). In at least one example embodiment of the present invention, the receive delay may be calculated based on Equation 1. Further, the receive delay may be adjusted more accurately as shown in FIG. 17.

An example embodiment may be achieved in whole or in part by an apparatus for transmitting a RACH signal to a base station in a SC-FDMA system that includes: a mapping unit to map a frequency domain RACH signal to a localized sub-frequency band of an entire frequency band available to the SC-FDMA system and a converting unit to convert the entire frequency band to a time domain sequence to be transmitted.

Another example embodiment may be achieved in whole or in part by an apparatus for receiving a RACH signal including at least one preamble from a mobile station in a SC-FDMA system. The apparatus may include a receiver to receive a signal from the mobile station, and a de-mapping unit to extract a frequency domain RACH signal from the received signal. The apparatus may also include a detect sequence generator to generate a detect sequence based on the extracted frequency domain RACH signal for a preamble candidate, and a detector to determine the presence of the preamble candidate and a receive delay from the detect sequence.

The frequency domain RACH signal may be mapped to a localized sub-frequency band of an entire frequency band available to the SC-FDMA system.

Another example embodiment may be achieved in whole or in part by an apparatus for receiving a RACH signal including at least one preamble from a mobile station in a SC-FDMA system in which the preamble includes a CAZAC sequence. The apparatus may include a receiver to receive a signal from the mobile station, a de-mapping unit to extract a frequency domain RACH signal from the received signal, and a differentiator to generate a differential sequence of the extracted frequency domain RACH signal. The apparatus may also include a converter to convert the differential sequence into a time domain detect sequence, a comparator to compare a maximum value of the detect sequence with a threshold, and a determiner to determine a transmitted CAZAC sequence based on a position of the maximum value within the detect sequence if the maximum value exceeds the threshold. Still further, the apparatus may include a correlator to perform correlation of the determined CAZAC sequence and the differential sequence to generate a correlation sequence, and a receive delay calculator to calculate receive delay from the correlation sequence.

Another example embodiment may be achieved in whole or in part by a method of transmitting a RACH signal to a base station in a SC-FDMA. The method may include mapping a frequency domain RACH signal to a localized sub-frequency band of an entire frequency band available to the SC-FDMA system, and converting the entire frequency band to a time domain sequence to be transmitted.

Another example embodiment may be achieved in whole or in part by a method of receiving a RACH signal including at least one preamble from a mobile station in a SC-FDMA system. The method may include receiving a signal from the mobile station, extracting a frequency domain RACH signal from the received signal, generating a detect sequence based on the extracted frequency domain RACH signal for each preamble candidate, and determining the presence of the preamble candidate and a receive delay from the detect sequence.

The frequency domain RACH signal may be mapped to a localized sub-frequency band of an entire frequency band available to the SC-FDMA system.

Another example embodiment may be achieved in whole or in part by a method of receiving a RACH signal including at least one preamble from a mobile station in a SC-FDMA system in which the preamble includes a CAZAC sequence. The method may include receiving a signal from the mobile station, extracting a frequency domain RACH signal from the received signal, and generating a differential sequence of the extracted frequency domain RACH signal. The method may also include converting the differential sequence into a time domain detect sequence, comparing a maximum value of the detect sequence with a threshold, and determining a transmitted CAZAC sequence based on a position of the maximum value within the detect sequence if the maximum value exceeds the threshold. The method may also include performing correlation of the determined CAZAC sequence and the differential sequence to generate a correlation sequence, and calculating a receive delay from the correlation sequence.

While embodiments of the present invention and its various functional components may have been described in particular embodiments, it should be appreciated that embodiments of the present invention can be implemented in hardware, software, firmware, middleware or a combination thereof and utilized in systems, subsystems, components or sub-components thereof. When implemented in software, elements of embodiments of the present invention may include instructions/code segments for performing tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, etc.).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Further, while embodiments of the present invention have been shown and described with respect to an embodiment, those skilled in the art will recognize that various changes and modifications may be made without departing from the spirit and scope of the invention as defined in the appended claims.

What is claimed is:

1. An apparatus for transmitting a random access channel (RACH) signal to a base station in a single carrier-frequency division multiple access (SC-FDMA) system, comprising:
a code generator to generate a code sequence for at least one preamble of the RACH signal;
a first converting unit to convert the code sequence into a frequency domain code sequence;
a mapping unit to map the frequency domain code sequence of the RACH signal to a portion of sub carriers, which are continuous and locally located in an entire frequency band available to the SC-FDMA system, and to allocate a guard band including at least one sub carrier between the frequency domain code sequence and other channel signal bands;
a second converting unit to convert the sub carriers to a time domain sequence to be transmitted;
a cyclic prefix (CP) inserting unit to insert a CP within the time domain sequence; and
a transmitting unit to transmit the time domain sequence.

2. The apparatus of claim 1, wherein the code sequence includes a Constant Amplitude Zero Autocorrelation waveform (CAZAC) sequence.

3. An apparatus for receiving a random access channel (RACH) signal including at least one preamble from a mobile station in a single carrier-frequency division multiple access (SC-FDMA) system, comprising:
a receiver to receive a signal from the mobile station;
an extracting unit to extract an RACH signal from the received signal;
a converting unit to convert the extracted RACH signal into a frequency domain sequence;
a de-mapping unit to extract sub carriers mapped to the RACH signal from the frequency domain sequence, the extracted sub carriers including the at least one preamble having a code sequence and being a portion of sub carriers, which are continuous and locally located in an entire frequency band available to the SC-FDMA system.

4. The apparatus of claim 3, wherein the code sequence includes a Constant Amplitude Zero Autocorrelation waveform (CAZAC) sequence.

5. A method of transmitting a random access channel (RACH) signal to a base station in a single carrier-frequency division multiple access (SC-FDMA) system, the method comprising:
generating a code sequence for at least one preamble of a RACH signal;
converting the code sequence into a frequency domain code sequence;
mapping the frequency domain code sequence of the RACH signal to a portion of sub carriers available to the SC-FDMA system;
allocating a guard band between the frequency domain code sequence and other channel signal bands;
converting the sub carriers to a time domain sequence to be transmitted;
inserting a cyclic prefix (CP) within the time domain sequence; and
transmitting the time domain sequence.

6. The method of claim 5, wherein the code sequence includes a Constant Amplitude Zero Autocorrelation waveform (CAZAC) sequence.

7. A method of receiving a random access channel (RACH) signal including at least one preamble from a mobile station in a single carrier-frequency division multiple access (SC-FDMA) system, comprising:
receiving a signal from the mobile station;
extracting an RACH signal from the received signal;
converting the extracted RACH signal into a frequency domain sequence; and
extracting sub carriers mapped to the RACH signal from the frequency domain sequence, the extracted sub carriers including at least one preamble having a code sequence and being a portion of sub carriers, which are continuous and locally located in an entire frequency band available to the SC-FDMA system.

8. The method of claim 7, wherein the code sequence includes a Constant Amplitude Zero Autocorrelation waveform (CAZAC) sequence.

* * * * *